US012794123B2

(12) United States Patent
Huang et al.

(10) Patent No.: US 12,794,123 B2
(45) Date of Patent: Nov. 10, 2026

(54) ANTENNA SYSTEM

(71) Applicant: Wistron NeWeb Corp., Hsinchu (TW)

(72) Inventors: Chin-Lien Huang, Hsinchu (TW); Wen-Tai Tseng, Hsinchu (TW); Kuo-Jen Lai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 78 days.

(21) Appl. No.: 18/666,531

(22) Filed: May 16, 2024

(65) Prior Publication Data

US 2024/0413533 A1 Dec. 12, 2024

(30) Foreign Application Priority Data

Jun. 8, 2023 (TW) ................................ 112121409

(51) Int. Cl.

| | |
|---|---|
| ***H01Q 1/48*** | (2006.01) |
| ***H01Q 5/35*** | (2015.01) |
| ***H01Q 5/371*** | (2015.01) |
| ***H01Q 5/50*** | (2015.01) |
| ***H01Q 9/04*** | (2006.01) |
| ***H01Q 9/42*** | (2006.01) |

(52) U.S. Cl.
CPC ............... *H01Q 5/50* (2015.01); *H01Q 9/045* (2013.01)

(58) Field of Classification Search
CPC ............ H01Q 1/48; H01Q 5/50; H01Q 9/045; H01Q 9/42
See application file for complete search history.

(56) References Cited

U.S. PATENT DOCUMENTS

| | | | | |
|---|---|---|---|---|
| 7,202,826 B2 * | 4/2007 | Grant | H01Q 21/30 343/702 |
| 8,427,373 B2 * | 4/2013 | Jiang | H01Q 9/0407 343/846 |
| 9,761,951 B2 * | 9/2017 | Kuonanoja | H01Q 9/42 |
| 2020/0112101 A1 * | 4/2020 | Yun | H01Q 1/38 |
| 2022/0416429 A1 * | 12/2022 | Matsunaga | H01Q 9/0435 |

FOREIGN PATENT DOCUMENTS

| | | |
|---|---|---|
| TW | M435740 U | 8/2012 |
| WO | WO2022123056 A1 * | 6/2022 |

OTHER PUBLICATIONS

Sharma et al., "A Meandered Rectangular Monopole Antenna for Quad-Band Applications", 2015 IEEE International Microwave and RF Conference (Year: 2015).*
Nella et al., "A Survey on Microstrip Antennas for Portable Wireless Communication System Applications", 2017 International Conference on Advances in Computing, Communications and Informatics, Sep. 13-16, 2017 (Year: 2017).*

* cited by examiner

*Primary Examiner* — Dimary S Lopez Cruz
*Assistant Examiner* — Marin Stoytchev Stoytchev
(74) *Attorney, Agent, or Firm* — McClure, Qualey & Rodack, LLP

(57) ABSTRACT

An antenna system includes a main ground element, a floating ground element, a first antenna element, and a second antenna element. The floating ground element is adjacent to the main ground element. The floating ground element is separated from the main ground element. The first antenna element has a first feeding point. The first antenna element is coupled to the floating ground element. The second antenna element has a second feeding point. The second antenna element is coupled to the main ground element.

20 Claims, 12 Drawing Sheets

ANTENNA SYSTEM

CROSS-REFERENCE TO RELATED PATENT APPLICATION

This application claims the benefit of priority to Taiwan Patent Application No. 112121409, filed on Jun. 8, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna system, in particular to an antenna system with an approximately omnidirectional radiation pattern.

BACKGROUND OF THE DISCLOSURE

With the advancement of mobile communication technology, mobile devices have become increasingly common in recent years. Common examples include laptops, mobile phones, multimedia players, and other portable electronic devices with mix functions. To meet people's needs, mobile devices typically come equipped with wireless communication capabilities. Some cover long-range wireless communication, such as mobile phones using 2G, 3G, long term evolution (LTE) systems, and operating in the frequency bands of 700 MHz, 850 MHz, 900 MHz, 1800 MHz, 1900 MHz, 2100 MHz, 2300 MHz, and 2500 MHz. Others cover short-range wireless communication, such as Wi-Fi and Bluetooth systems using the 2.4 GHz, 5.2 GHz, and 5.8 GHz frequency bands for communication.

Antennas are indispensable components in the field of wireless communication. If the directivity of an antenna used for signal reception or transmission is too high, it can easily lead to a decline in the communication quality of the associated mobile device. Therefore, how to design small-sized, omnidirectional antenna systems is an important challenge for antenna designers.

SUMMARY OF THE DISCLOSURE

In an exemplary embodiment, the present disclosure provides an antenna system including a main ground element, a floating ground element, a first antenna element, and a second antenna element. The floating ground element is adjacent to the main ground element in which the floating ground element is separated from the main ground element. The first antenna element has a first feeding point in which the first antenna element is coupled to the floating ground element. The second antenna element has a second feeding point in which the second antenna element is coupled to the main ground element.

In some embodiments, the floating ground element is surrounded by the main ground element, and a partition gap is formed between the floating ground element and the main ground element.

In some embodiments, the floating ground element and the main ground element are on different planes, and a vertical projection of the floating ground element is at least partially overlapped with the main ground element.

In some embodiments, the first antenna element supports a vehicle communication and covers a first frequency band.

In some embodiments, the first frequency band is between 5850 MHz and 5925 MHz.

In some embodiments, the first antenna element is a monopole antenna.

In some embodiments, the first antenna element includes a first radiation portion, a second radiation portion, and a third radiation portion. The first radiation portion is coupled to the first feeding point. The third radiation portion is coupled to the first radiation portion through the second radiation portion.

In some embodiments, the first radiation portion substantially has a wide stripe shape.

In some embodiments, a length of the first radiation portion is approximately equal to 0.25 times the wavelength of the first frequency band.

In some embodiments, the second radiation portion substantially has a meandering shape.

In some embodiments, a length of the second radiation portion is approximately equal to 0.5 times the wavelength of the first frequency band.

In some embodiments, the third radiation portion substantially has a narrow strip shape.

In some embodiments, a length of the third radiation portion is approximately equal to 0.5 times the wavelength of the first frequency band.

In some embodiments, the second antenna element supports a mobile communication and covers a second frequency band, a third frequency band, and a fourth frequency band.

In some embodiments, the second frequency band is between 617 MHz and 960 MHz, the third frequency band is between 1710 MHz and 2690 MHz, and the fourth frequency band is between 3300 MHz and 5925 MHz.

In some embodiments, the second antenna element is a monopole antenna, a dipole antenna, a loop antenna, a patch antenna, a planar inverted F antenna, or a chip antenna.

In some embodiments, the second antenna element includes a fourth radiation portion, a fifth radiation portion, a sixth radiation portion, and a seventh radiation portion. The fourth radiation portion is coupled to the second feeding point. The fifth radiation portion is coupled to the fourth radiation portion in which the fifth radiation portion and the fourth radiation portion are respectively disposed on two vertical planes. The sixth radiation portion is coupled to the fourth radiation portion in which a slot is formed between the sixth radiation portion and the fourth radiation portion. The seventh radiation portion is coupled to the second feeding point.

In some embodiments, a specific distance between the second antenna element and the first antenna element is between 40 mm and 60 mm.

In some embodiments, the antenna system further includes a carrier plate, a printed circuit board, a system ground plane, and one or more conductive elements. The floating ground element is disposed on the carrier plate. The printed circuit board is configured to support the carrier plate in which the main ground element is disposed on the printed circuit board. The main ground element is further coupled to the system ground plane through the conductive elements.

In some embodiments, the antenna system further includes a third antenna element and a fourth antenna element. The first antenna element, the second antenna element, the third antenna element, and the fourth antenna element are interleaved with each other and arranged in the same straight line.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
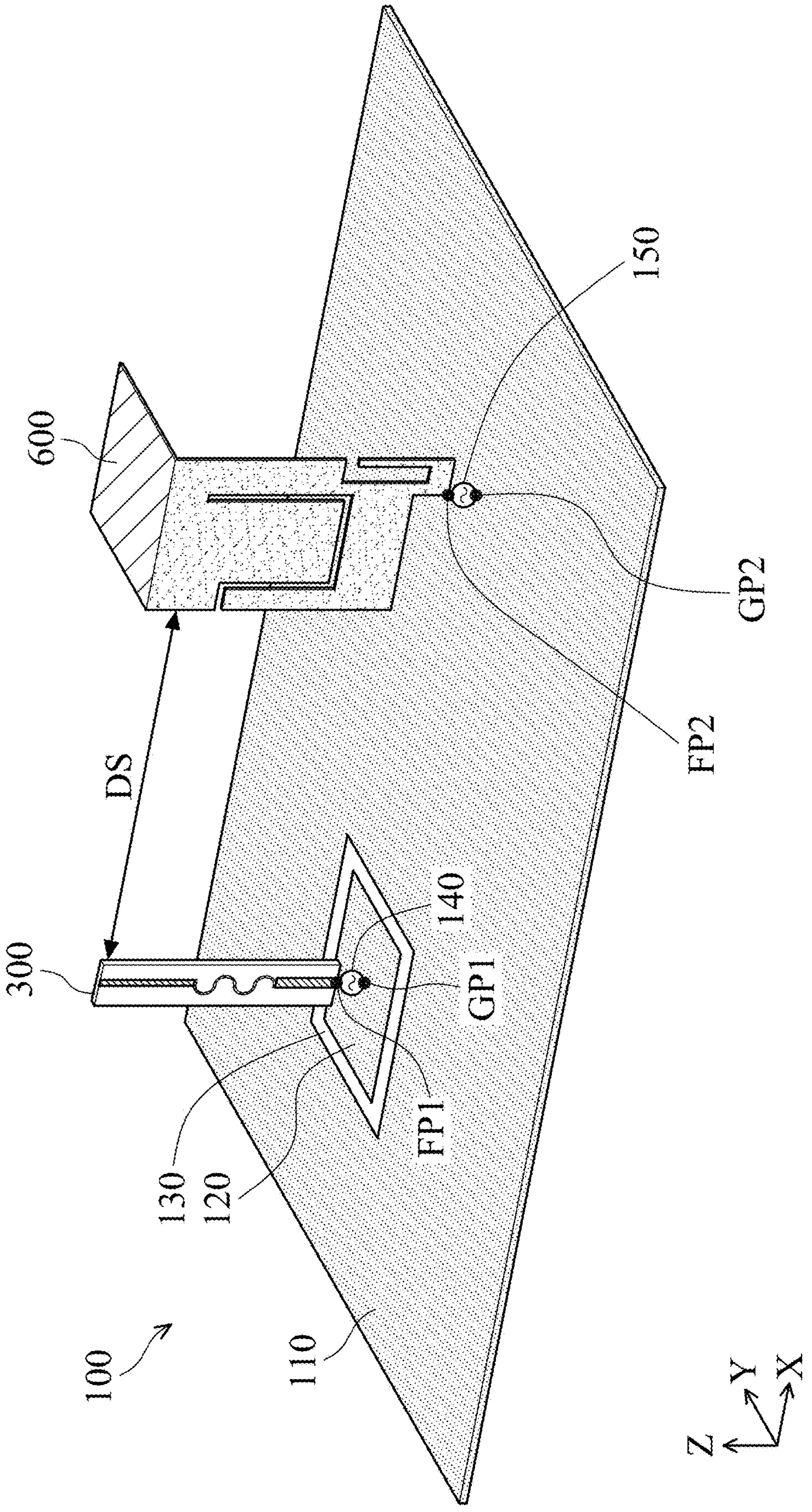
FIG. 1 is a perspective view of an antenna system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. In addition, the term "couple" in the present disclosure includes any direct and indirect electrical connection means.

FIG. 1 is a perspective view of an antenna system 100 according to an embodiment of the present disclosure. The antenna system 100 can be applied to a vehicle device but is not limited thereto. In the embodiment of FIG. 1, the antenna system 100 at least includes a main ground element 110, a floating ground element 120, a first antenna element 300, and a second antenna element 600. Both the main ground element 110 and the floating ground element 120 can be made of metal materials, such as copper, silver, aluminum, iron, or their alloys. For example, the first antenna element 300 can be a vehicle-to-everything (V2X) antenna of a first communication system, which can be applied to vehicle-to-vehicle communication and roadside-to-vehicle communication. In addition, the second antenna element 600 can be a cellular antenna of a second communication system, which can be applied to the mobile communication field, and can communicate with a mobile phone or a data terminal.

Figure 2:
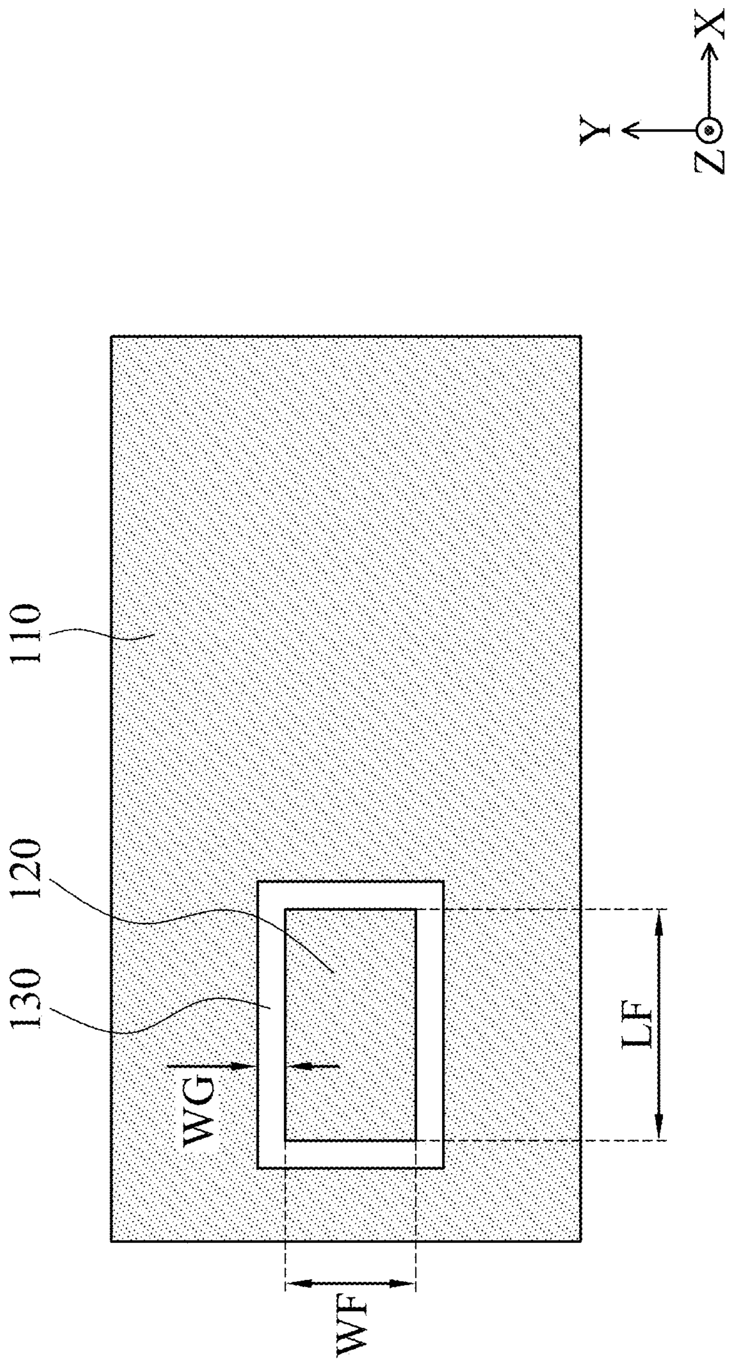
FIG. 2 is a top view of a main ground element and a floating ground element according to an embodiment of the present disclosure.

FIG. 2 is a top view of the main ground element 110 and the floating ground element 120 according to an embodiment of the present disclosure. Please refer to FIGS. 1 and 2 together. The floating ground element 120 is adjacent to the main ground element 110. The floating ground element 120 can be completely separated from the main ground element 110. For example, the main ground element 110 may substantially have a wide stripe shape that has a hollow portion, and the floating ground element 120 can be surrounded by the main ground element 110. A partition gap 130 is formed between the floating ground element 120 and the main ground element 110. It is noted that the wordings of "adjacent" or "neighboring" in the present disclosure may mean that a spacing between the corresponding two elements is less than a predetermined distance (e.g., 10 mm or less) but usually does not include the case of direct contact (i.e., the spacing as mentioned is shrinking to 0) between the two corresponding elements. However, the present disclosure is not limited thereto. In other embodiments, the main ground element 110 may substantially have a complete shape without any hollowed-out portion, in which a vertical spacing (along the direction of Z axis) may be formed between the floating ground element 120 and the main ground element 110. For example, the floating ground element 120 can be located on a carrier board in which the carrier board can be disposed on the main ground element 110. In other words, if both the floating ground element 120 and the main ground element 110 are not on the same plane, a vertical projection of the floating ground element 120 can be at least partially overlapped with the main ground element 110.

The present disclosure does not particularly limit the shape and type of the first antenna element 300 and the second antenna element 600. For example, the first antenna element 300 can be a monopole antenna, and the second antenna element 600 can be a monopole antenna, a dipole antenna, a loop antenna, a patch antenna, a planar inverted F antenna (PIFA), or a chip antenna.

The first antenna element 300 has a first feeding point FP1, in which the first feeding point FP1 can be coupled to a positive electrode of a first signal source 140. In addition, a first grounding point GP1 can be coupled to a negative electrode of the floating ground element 120 and the first signal source 140. For example, the first signal source 140 can be a radio frequency (RF) module, which can be used to excite the first antenna element 300. That is, the first antenna element 300 can be coupled to the floating ground element 120 through the first signal source 140.

The second antenna element 600 has a second feeding point FP2, in which the second feeding point FP2 can be coupled to a positive electrode of a second signal source 150. In addition, a second grounding point GP2 can be coupled to a negative electrode of the ground element 110 and the second signal source 150. For example, the second signal source 150 can be another RF module, which can be used to excite the second antenna element 600. That is, the second antenna element 600 can be coupled to the main ground element 110 through the second signal source 150. In some embodiments, there is a specific distance DS between the second antenna element 600 and the first antenna element 300, so that the isolation between the first antenna element 300 and the second antenna element 600 can be improved.

It is noted that since the floating ground element 120 is separated from the main ground element 110, the relevant radiation pattern of the first antenna element 300 may not be negatively affected by the main ground element 110. According to measurement results, even if the antenna system 100 is disposed adjacent to a large ground plane (e.g., a metal roof of a car), the first antenna element 300 can still provide an approximately omnidirectional radiation pattern. In other words, neither the main ground element 110 nor the metal roof as mentioned is regarded as a reflective plane of the first antenna element 300. Therefore, the antenna system 100 can be used to receive or transmit wireless signals in different directions.

The following embodiments will introduce different configurations and detailed structural features of the antenna system 100. It should be understood that these drawings and descriptions are only examples and are not intended to limit the scope of the present disclosure.

Figure 3:
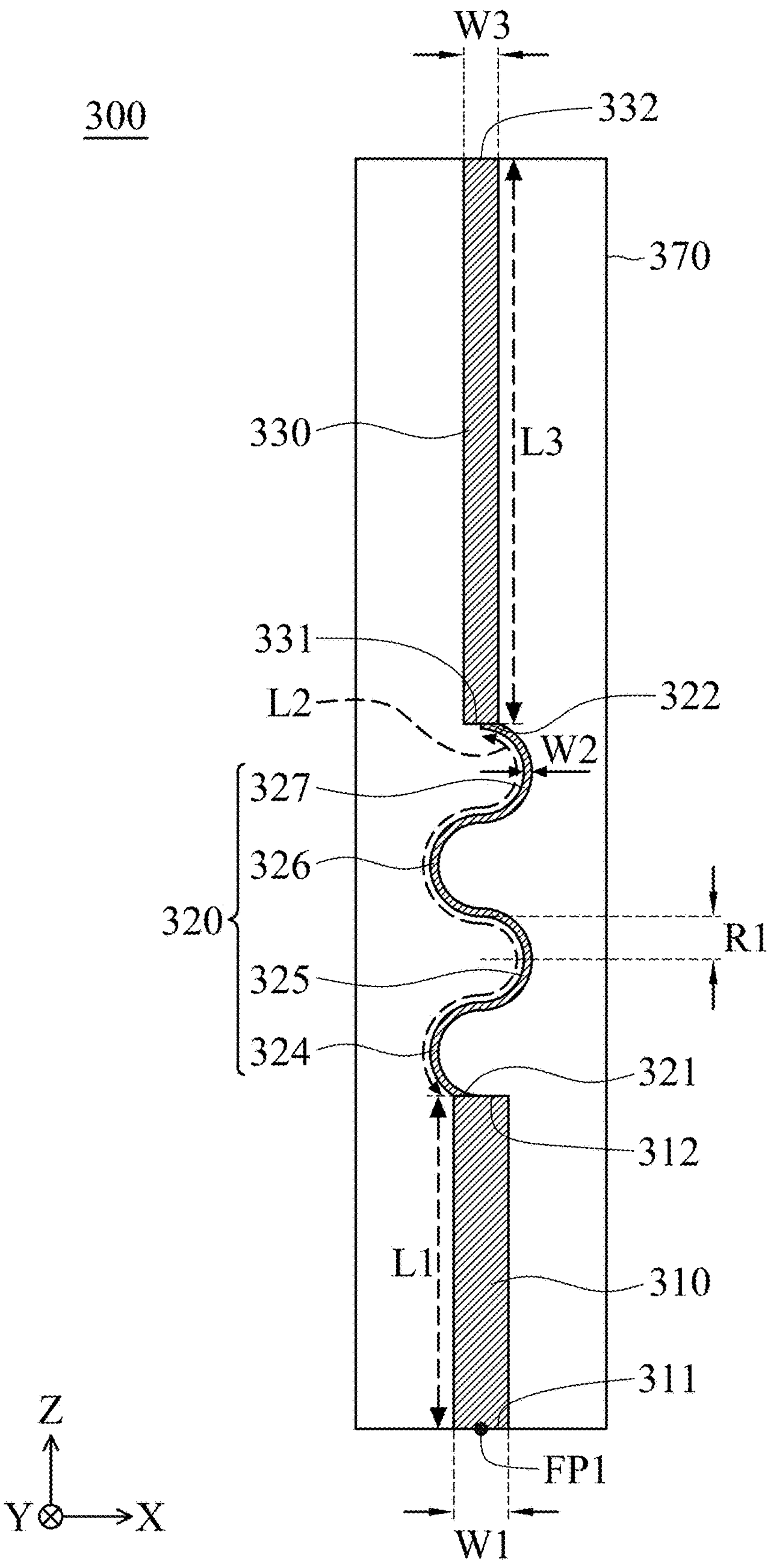
FIG. 3 is a front view of a first antenna element according to an embodiment of the present disclosure.

FIG. 3 is a front view of the first antenna element 300 according to an embodiment of the present disclosure. In the embodiment of FIG. 3, the first antenna element 300 at least includes a first radiation portion 310, a second radiation portion 320, and a third radiation portion 330, which can all be made of metal materials. In some embodiments, the first antenna element 300 can further include a dielectric substrate 370, in which the first radiation portion 310, the second radiation portion 320, and a third radiation portion 330 can all be disposed on the same surface of the dielectric substrate 370.

Specifically, the first radiation portion 310 has a first end 311 and a second end 312, in which the first end 311 of the first radiation portion 310 is coupled to the first feeding point FP1. In some embodiments, the first radiation portion 310 may substantially have a wide stripe shape.

Specifically, the second radiation portion 320 has a first end 321 and a second end 322, in which the first end 321 of the second radiation portion 320 is coupled to the second end 312 of the first radiation portion 310. In some embodiments, the second radiation portion 320 includes a first semicircular arc portion 324, a second semicircular arc portion 325, a third semicircular arc portion 326, and a fourth semicircular arc portion 327, which are coupled in series between the first end 321 and the second end 322 of the second radiation portion 320. For example, an opening of each of the first semicircular arc portion 324 and the third semicircular arc portion 326 can face the same direction (e.g., the direction of +X axis), and an opening of each of the second semicircular arc portion 325 and the fourth semicircular arc portion 327 can face the opposite direction (e.g., the direction of −X axis), but is not limited thereto. In some embodiments, the second radiation portion 320 may substantially have a meandering shape.

Specifically, the third radiation portion 330 has a first end 331 and a second end 332, in which the first end 331 of the third radiation portion 330 is coupled to the second end 322 of the second radiation portion 320, and the second end 332 of the third radiation portion 330 is an open end. That is, the third radiation portion 330 can be coupled to the first radiation portion 310 through the second radiation portion 320. In some embodiments, the third radiation portion 330 may substantially have a narrow stripe shape (compared to the first radiation portion 310). In some embodiments, the first radiation portion 310, the second radiation portion 320, and the third radiation portion 330 can all be substantially arranged on the same straight line.

Figure 4:
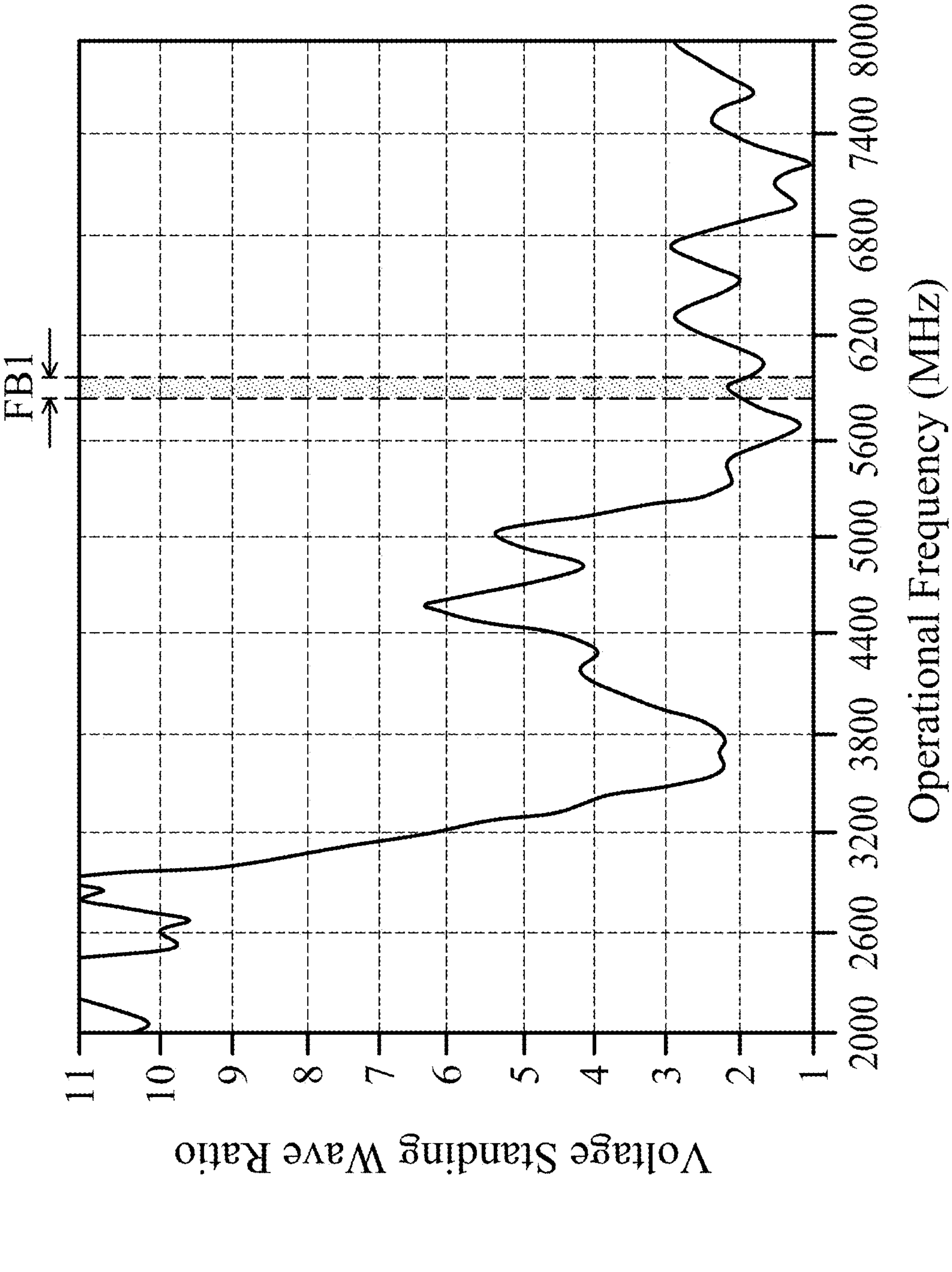
FIG. 4 is a voltage standing wave ratio (VSWR) diagram of the first antenna element according to an embodiment of the present disclosure.

FIG. 4 is a voltage standing wave ratio (VSWR) diagram of the first antenna element 300 according to an embodiment of the present disclosure. The horizontal axis represents operational frequency (MHz), and the vertical axis represents VSWR. According to the measurement result in FIG. 4, the first antenna element 300 can cover a first frequency band FB1. For example, the first frequency band FB1 can be between 5850 MHz and 5925 MHz. Therefore, the first antenna element 300 of the antenna system 100 at least can support broadband operation for vehicle communication.

In some embodiments, the operational principle of the first antenna element 300 of the antenna system 100 can be described as follows. Because of the existence of the floating ground element 120, the equivalent resonance length of the first radiation portion 310 is roughly equal to twice its actual length L1. The second radiation portion 320 can be used to fine-tune a phase difference between the third radiation portion 330 and the first radiation portion 310. For example, if the third radiation portion 330 and the first radiation portion 310 are in-phase, the radiation gain of the first antenna element 300 can be further enhanced. In addition, a width W3 of the third radiation portion 330 is smaller than or equal to half of a width W1 of the first radiation portion 310, which can be used to improve the impedance matching of the first antenna element 300 in the first frequency band FB1.

Figure 5:
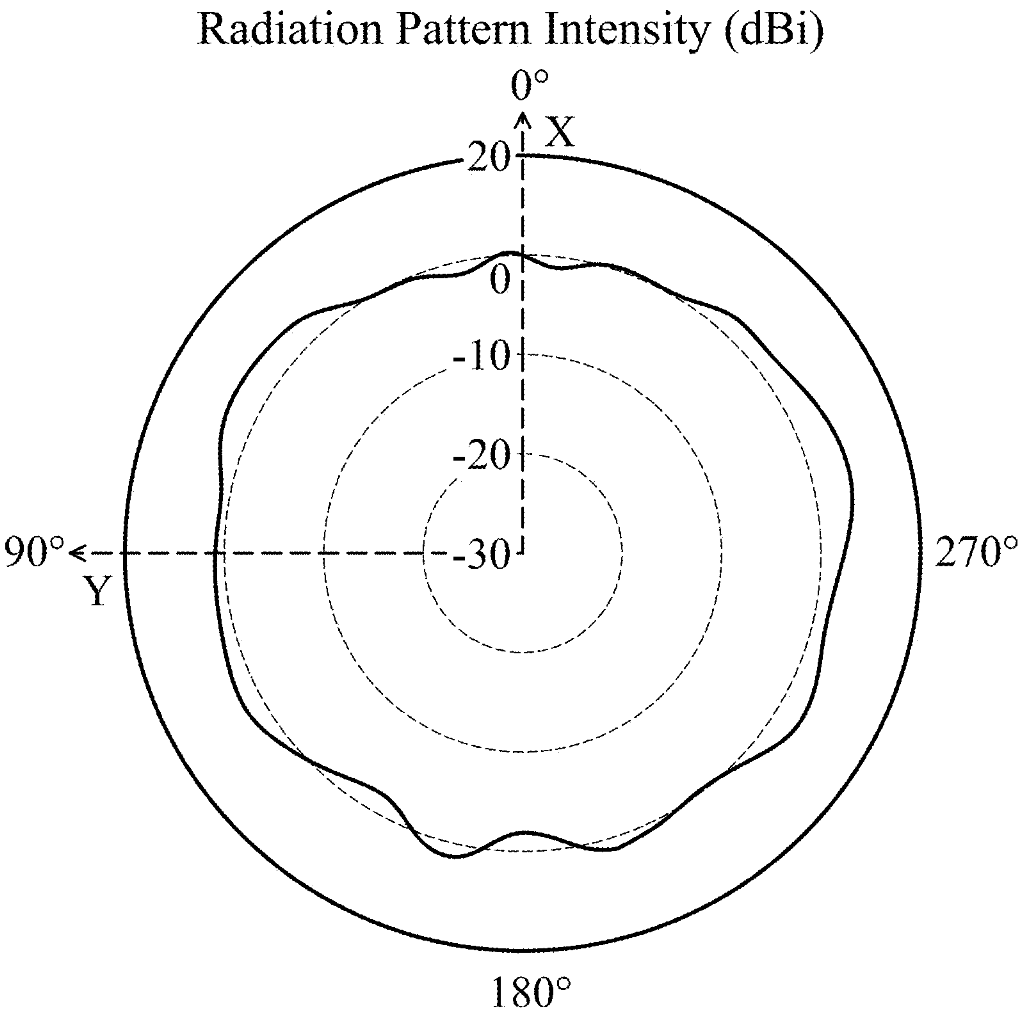
FIG. 5 is a radiation pattern diagram of the first antenna element according to an embodiment of the present disclosure.

FIG. 5 is a radiation pattern diagram (which can be measured along XY plane) of the first antenna element 300 according to an embodiment of the present disclosure. According to the measurement result of FIG. 5, the first antenna element 300 of the antenna system 100 can provide an approximately omnidirectional radiation pattern by using the floating ground element 120, which can meet the actual application requirements of general vehicle communication.

Figure 6:
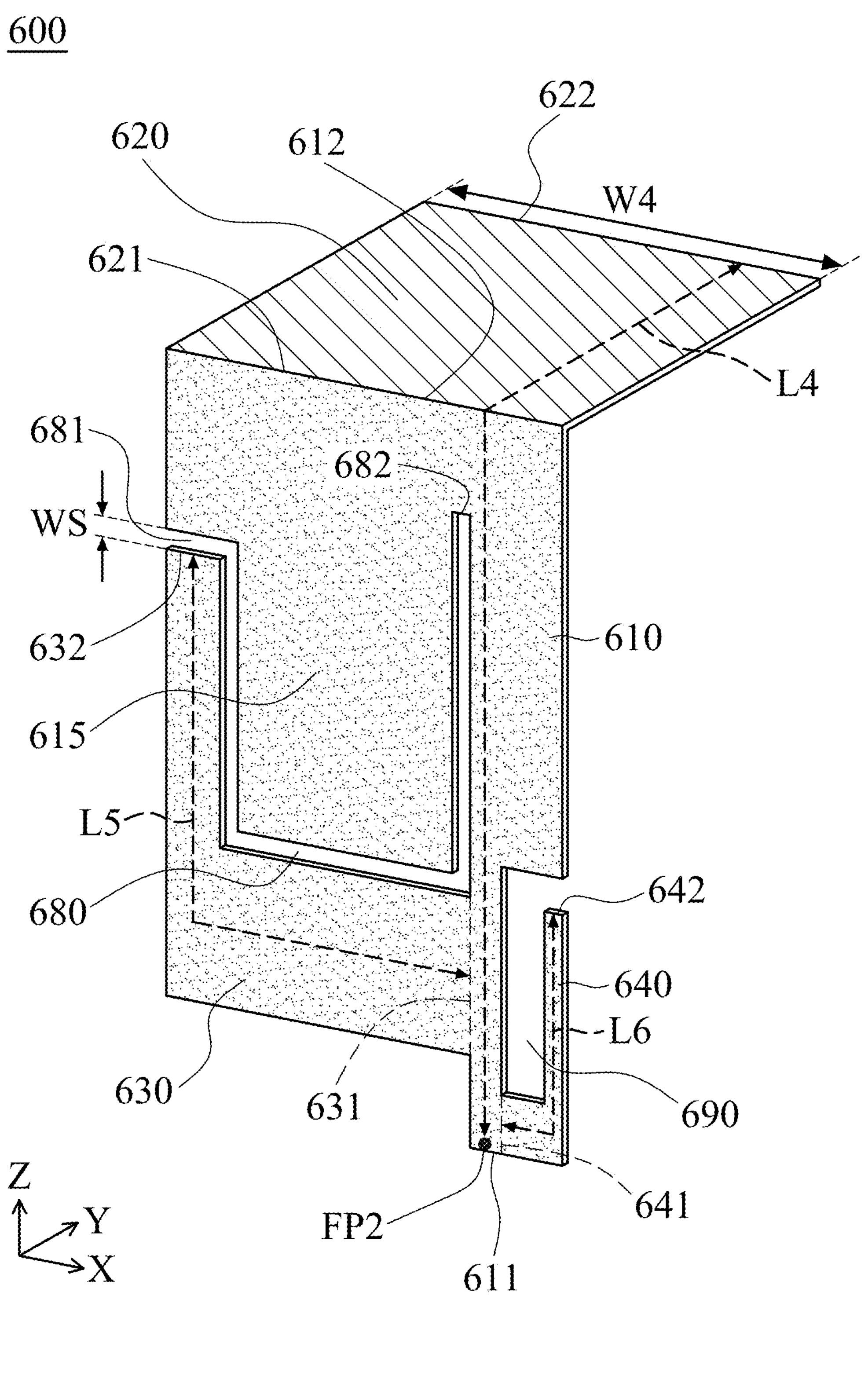
FIG. 6 is a perspective view of the second antenna element according to an embodiment of the present disclosure.

FIG. 6 is a perspective view of the second antenna element 600 according to an embodiment of the present disclosure. In the embodiments of FIG. 6, the second antenna element 600 includes a fourth radiation portion 610, a fifth radiation portion 620, a sixth radiation portion 630, and a seventh radiation portion 640, which can all be made of metal materials.

Specifically, the fourth radiation portion 610 has a first end 611 and a second end 612, in which the first end 611 of the fourth radiation portion 610 is coupled to the second feeding point FP2. In some embodiments, the fourth radiation portion 610 further includes a protruding portion 615 which may substantially have a rectangle or a square shape. In addition, the protruding portion 615 of the fourth radiation portion 610 can further extend along a direction in proximity to the sixth radiation portion 630. In some embodiments, the fourth radiation portion 610 may substantially have an irregular shape.

Specifically, the fifth radiation portion 620 has a first end 621 and a second end 622, in which the first end 621 of the fifth radiation portion 620 is coupled to the second end 612 of the fourth radiation portion 610, and the second end 622 of the fifth radiation portion 620 is an open end. In some embodiments, the fifth radiation portion 620 and the fourth radiation portion 610 are respectively disposed on two perpendicular planes. For example, the fourth radiation portion 610 can be disposed parallel to XZ plane, and the fifth radiation portion 620 can be disposed parallel to XY plane, but is not limited thereto. In some embodiments, the fifth radiation portion 620 may substantially have a rectangle shape.

Specifically, the sixth radiation portion 630 has a first end 631 and a second end 632, in which the first end 631 of the sixth radiation portion 630 is coupled to the first end 611 of the fourth radiation portion 610, and the second end 632 of the sixth radiation portion 630 is an open end. In some embodiments, a slot 680 can be formed between the sixth radiation portion 630 and the fourth radiation portion 610. For example, the slot 680 may substantially have a U shape, and has an open end 681 and a closed end 682. In addition, the slot 680 can further at least partially enclose the protrusion 615 of the fourth radiation portion 610. In some embodiments, the sixth radiation portion 630 may substantially have a wide L shape.

Specifically, the seventh radiation portion 640 has a first end 641 and a second end 642, in which the first end 641 of the seventh radiation portion 640 is coupled to the second feeding point FP2, and the second end 642 of the seventh radiation portion 640 is an open end. For example, both the second end 642 of the seventh radiation portion 640 and the second end 632 of the sixth radiation portion 630 can roughly extend toward the same direction. In some embodiments, both the seventh radiation portion 640 and the fourth radiation portion 610 can further enclose an L-shaped notch 690 together. In some embodiments, the fourth radiation portion 610, the sixth radiation portion 630, and the seventh radiation portion 640 can all be disposed on the same plane, in which the plane as mentioned can roughly be perpendicular to the fifth radiation portion 620. In some embodiments, the seventh radiation portion 640 may substantially have a narrow L shape (compared to the sixth radiation portion 630).

Figure 7:
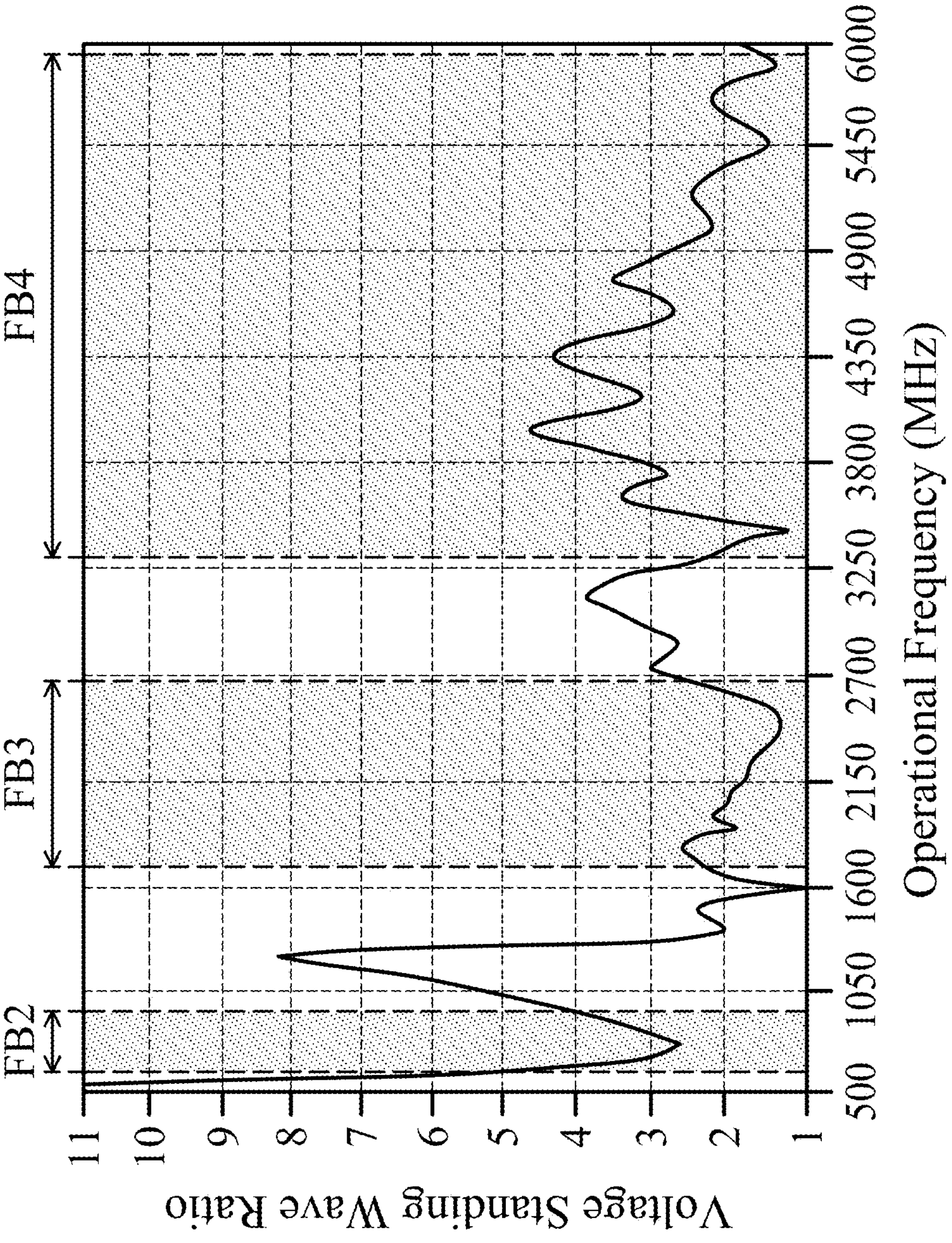
FIG. 7 is a VSWR diagram of the second antenna element according to an embodiment of the present disclosure.

FIG. 7 is a VSWR diagram of the second antenna element 600 according to an embodiment of the present disclosure. The horizontal axis represents frequency (MHz), and the vertical axis represents VSWR. According to the result of measurement in FIG. 7, the second antenna element 600 can cover a second frequency band FB2, a third frequency band FB3, and a fourth frequency band FB4. For example, the second frequency band FB2 can be between 617 MHz and 960 MHz, the third frequency band FB3 can be between 1710 MHz and 2690 MHz, and the fourth frequency band FB4 can be between 3300 MHz and 5925 MHz. Therefore, the second antenna element 600 of the antenna system 100 can at least support the broadband operation of mobile communication, especially in the long term evolution (LTE) frequency band.

In some embodiments, the operational principle of the second antenna element 600 of the antenna system 100 can be described as follows. The fourth radiation portion 610 and the fifth radiation portion 620 can jointly be excited to generate the second frequency band FB2 as mentioned. The sixth radiation portion 630 can be excited to generate the third frequency band FB3 as mentioned. In addition, the seventh radiation portion 640 can be excited to generate the fourth frequency band FB4 as mentioned. According to actual measurement results, the addition of the slot 680 and the L-shaped notch 690 helps to fine-tune the impedance matching of the second frequency band FB2, the third frequency band FB3, and the fourth frequency band FB4 as mentioned at the same time.

In some embodiments, the dimensions of the elements of the antenna system 100 may be as follows. A width WG of the partition gap 130 between the main ground element 110 and the floating ground element 120 can be between 2 mm and 5 mm. A length LF of the floating ground element 120 can be greater than or equal to 20 mm. A width WF of the floating ground element 120 can be greater than or equal to 20 mm. A length L1 of the first radiation portion 310 can be approximately equal to 0.25 times the wavelength (λ/4) of the first frequency band FB1 of the first antenna element 300. A width W1 of the first radiation portion 310 can be between 1 mm and 3 mm. A length L2 of the second radiation portion 320 can be approximately equal to 0.5 times the wavelength (λ/2) of the first frequency band FB1 of the first antenna element 300. A width W2 of the second radiation portion 320 can be between 0.2 mm and 0.4 mm. In the second radiation portion 320, each radius R1 of the semicircular arc portion can be between 2 mm and 2.2 mm. A length L3 of the third radiation portion 330 can be approximately equal to 0.5 times the wavelength (λ/2) of the first frequency band FB1 of the first antenna element 300. A width W3 of the third radiation portion 330 can be between 0.5 mm and 1.5 mm. The total length L4 of the fourth radiation portion 610 and the fifth radiation portion 620 can be approximately equal to 0.25 times the wavelength (λ/4) of the second frequency band FB2 of the second antenna element 600. A width W4 of the fifth radiation portion 620 can be greater than or equal to 20 mm. A length L5 of the sixth radiation portion 630 can be approximately equal to 0.25 times the wavelength (λ/4) of the third frequency band FB3 of the second antenna element 600. A length L6 of the seventh radiation portion 640 can be approximately equal to 0.25 times the wavelength (λ/4) of the fourth frequency band FB4 of the second antenna element 600. A width WS of the slot 680 can be between 0.5 mm and 1.5 mm. A specific distant DS between the first antenna element 300 and the second antenna element 600 can be between 40 mm and 60 mm. The above dimension ranges are obtained based on multiple experimental results, which help to optimize the omnidirectionality, operational bandwidth, and impedance matching of the antenna system 100.

Figure 8A:
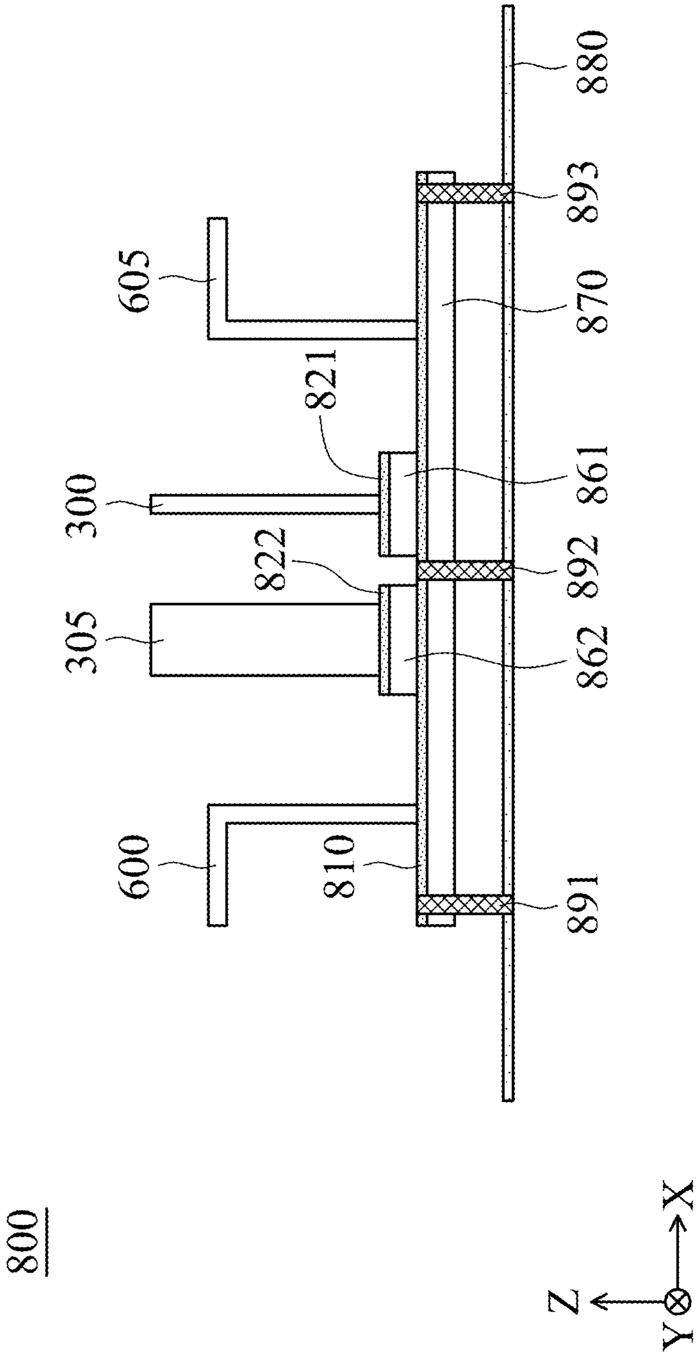
FIG. 8A is a cross-sectional view of an antenna system according to another embodiment of the present disclosure.
Figure 8B:
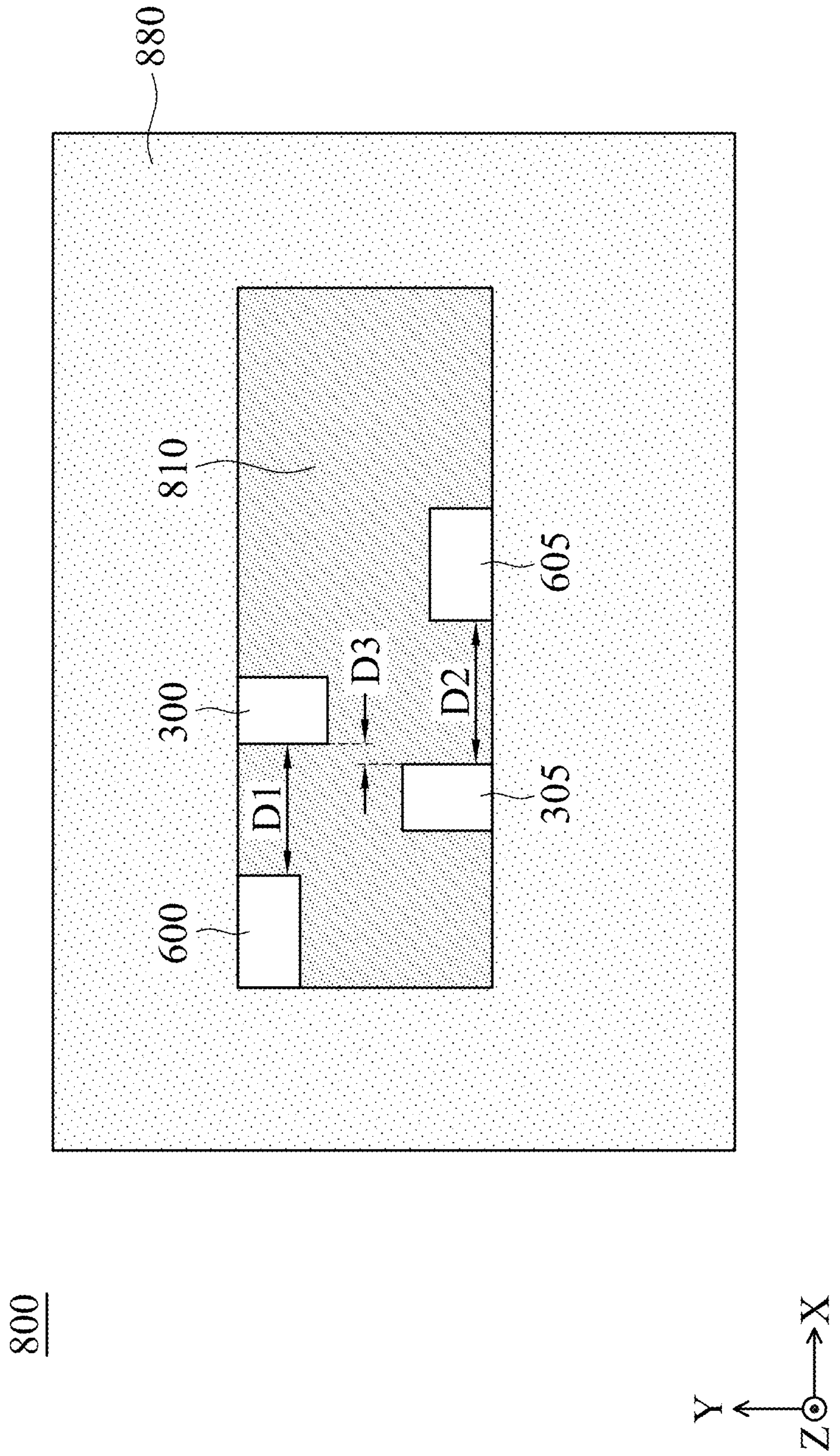
FIG. 8B is a top view of the antenna system according to the embodiment of the present disclosure.

FIG. 8A is a cross-sectional view of an antenna system 800 according to another embodiment of the present disclosure. FIG. 8B is a top view of the antenna system 800 according to the embodiment of the present disclosure. Please refer to FIGS. 8A and 8B together. FIGS. 8A and 8B are similar to FIG. 1. In the embodiments of FIGS. 8A and 8B, the antenna system 800 includes a main ground element 810, two floating ground element 821, 822, a first antenna element 300, a second antenna element 600, a third antenna element 305, a fourth antenna element 605, two carrier boards 861, 862, a printed circuit board (PCB) 870, a system ground plane 880, and one or more conductive elements 891, 892, 893.

The third antenna element 305 can have the same structure as the first antenna element 300 in the embodiment of FIG. 3, and the fourth antenna element 605 can have the same structure as the second antenna element 600 in the embodiment of FIG. 6, so it will not be repeated herein. In some embodiments, each of the first antenna element 300 and the third antenna element 305 can be coupled to the corresponding floating ground element 821, 822 respectively. Each of the second antenna element 600 and the fourth antenna element 605 can be coupled to the corresponding main ground element 810, but is not limited thereto. Generally, both the first antenna element 300 and the third antenna element 305 can be disposed between the second antenna element 600 and the fourth antenna element 605. A first distance D1 is between the first antenna element 300 and the second antenna element 600, in which the first distance D1 can be between 40 mm and 60 mm. A second distance D2 is between the third antenna element 305 and the fourth antenna element 605, in which the second distance D2 can also be between 40 mm and 60 mm. A third distance D3 is between the first antenna element 300 and the third antenna element 305, in which the third antenna element D3 can be between 15 mm and 21 mm. It is noted that the first antenna element 300, the second antenna element 600, the third antenna element 305, and the fourth antenna element 605 are not arranged on the same straight line, and this arrangement can improve the isolation between these antennas.

Figure 8C:
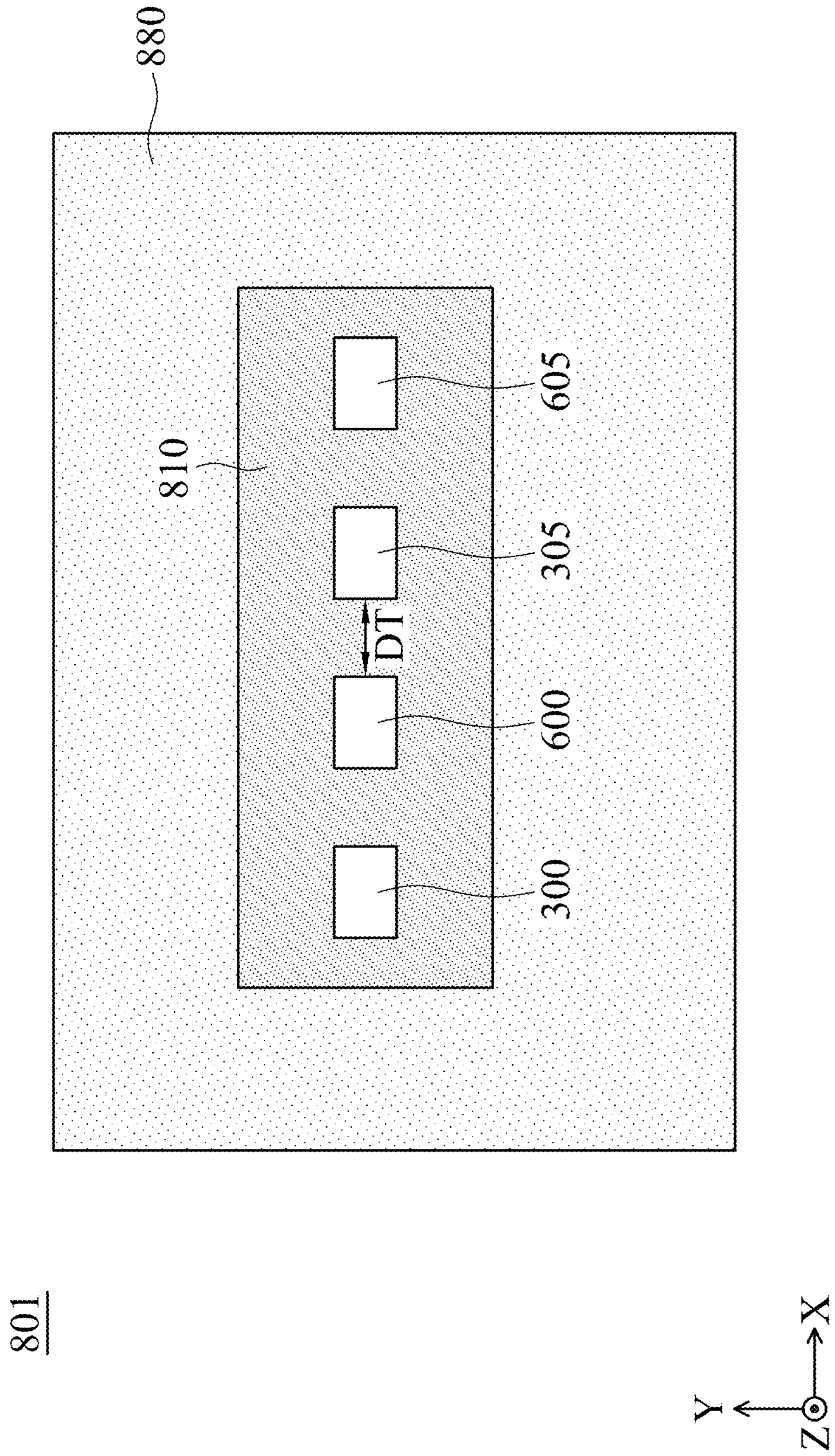
FIG. 8C is a top view of an antenna system according to another embodiment of the present disclosure.

FIG. 8C is a top view of an antenna system 801 according to another embodiment of the present disclosure. In the embodiment of FIG. 8C, the first antenna element 300, the second antenna element 600, the third antenna element 305, and the fourth antenna element 605 can be interleaved with each other and arranged in the same straight line, in which a predetermined distance DT between any two neighboring elements can be between 15 mm and 21 mm. In addition, the first antenna element 300 and the third antenna element 305 respectively can be a first type antenna (e.g., a V2X antenna), and the second antenna element 600 and the fourth antenna element 605 respectively can be a second type antenna (e.g., an LTE antenna).

Figure 8D:
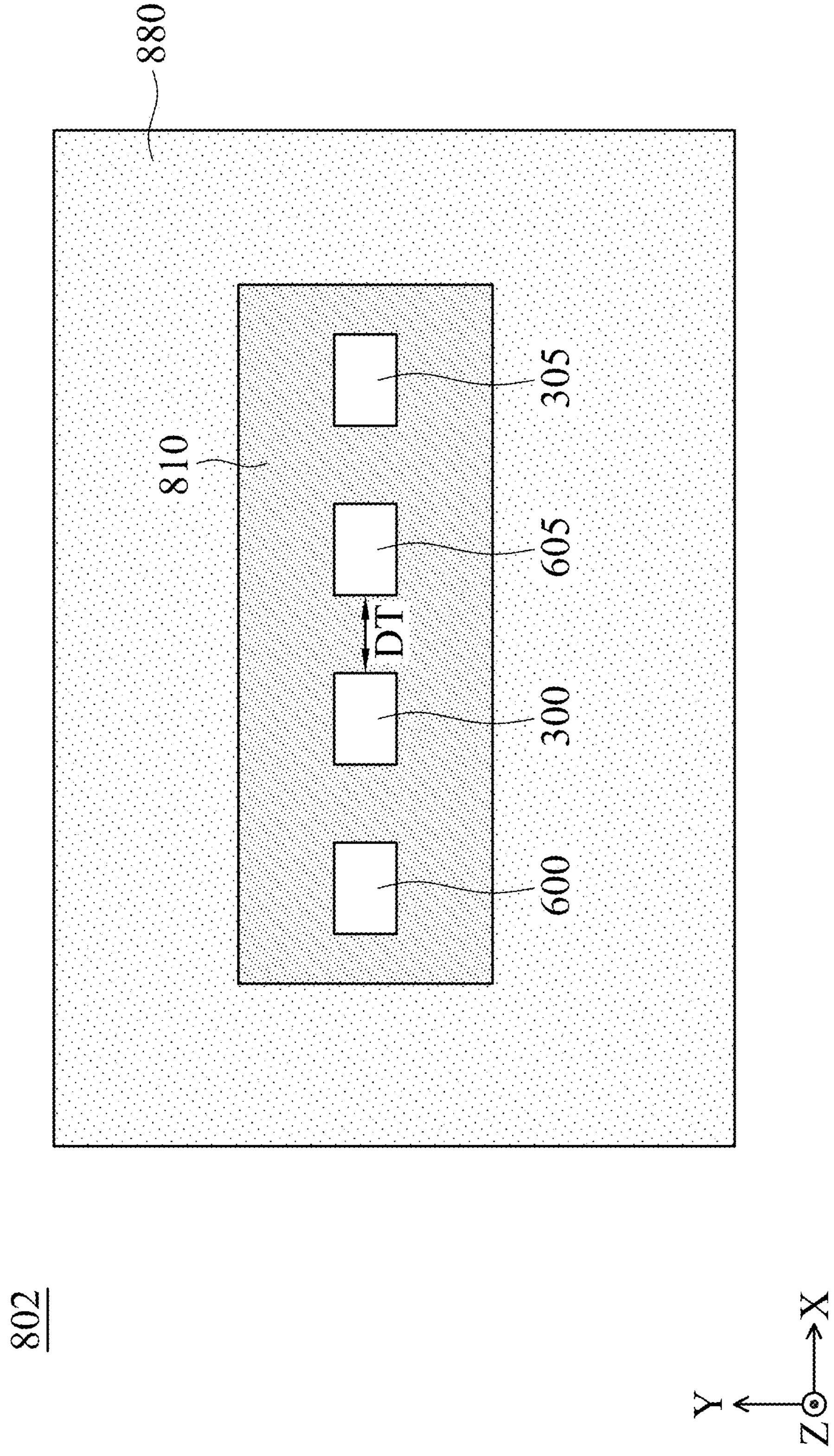
FIG. 8D is a top view of an antenna system according to another embodiment of the present disclosure.

FIG. 8D is a top view of an antenna system 802 according to yet another embodiment of the present disclosure. In the embodiment of FIG. 8D, the first antenna element 300, the second antenna element 600, the third antenna element 305, and the fourth antenna element 605 can be interleaved with each other and arranged in the same straight line, in which the second antenna element 600 can be moved to be in front of the first antenna element 300, and the fourth antenna element 605 can be moved to be in front of the third antenna element 305.

The floating ground element 821 can be disposed on the carrier board 861, which can be used by the first antenna element 300. Similarly, another floating ground element 822 can be disposed on another carrier board 862, which can be used by the third antenna element 305. However, the present disclosure is not limited thereto. In another embodiment, the floating ground element 821, 822 can also be respectively implemented by a metal plate, and the carrier boards 861, 862 as mentioned can be omitted. A printed circuit board 870 can be configured to support the carrier boards 861, 862 as mentioned, in which the main ground element 810 can be disposed above the printed circuit board 870. Therefore, both the floating ground elements 821, 822 as mentioned can be located above the ground element 810, and can be completely separated from the main ground element 810. The main ground element 810 can be further coupled to the system ground plane 880 through the conductive elements 891, 892, 893 as mentioned. For example, the system ground plane 880 can be a metal roof of a car, but is not limited thereto. In addition, vertical projections of each of the floating ground elements 821, 822 as mentioned can be at least partially overlapped with the main ground element 810. In another embodiment, the antenna system 800 can further include more antenna elements, more floating ground elements, and more carrier boards in response to various needs. In other embodiments, the floating ground elements 821, 822 and the main ground element 810 can be disposed on the same plane and completely separated from one another. The floating ground elements 821, 822 can be surrounded by the main ground element 810, in which a partition gap can be formed between the floating ground elements 821, 822 and the main ground element 810.

Figure 9:
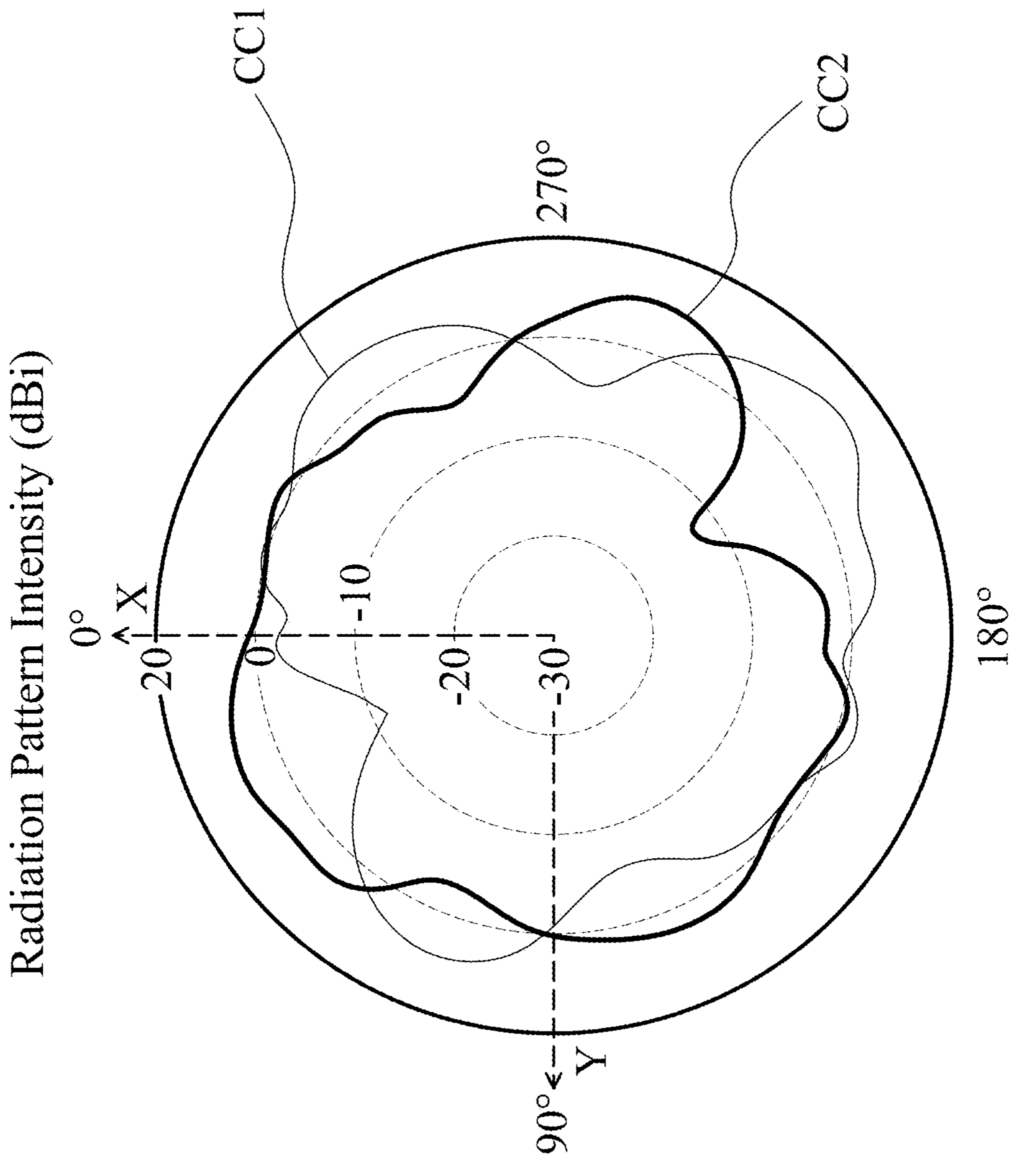
FIG. 9 is a radiation pattern diagram of the antenna system according to another embodiment of the present disclosure.

FIG. 9 is a radiation pattern diagram (which can be measured along XY plane) of the antenna system 800 according to another embodiment of the present disclosure. As shown in FIG. 9, a first curve CC1 can represent a radiation pattern of the first antenna element 300, and a second curve CC2 can represent a radiation pattern of the third antenna element 305. According to the measurement result of FIG. 9, the first antenna element 300 and the third antenna element 305 of the antenna system 800 can provide a complementary radiation pattern, in which the maximum radiation gain of the first antenna element 300 and the third antenna element 305 can reach 5.7 dBi. The remaining features of the antenna system 800 in FIGS. 8A and 8B are similar to the antenna system 100 in FIG. 1, so both embodiments can achieve similar operational effects.

The present disclosure provides a novel antenna system. Compared with the traditional design, the present disclosure at least has the advantages of approximately omnidirectional radiation pattern and relatively high radiation gain, so it is very suitable for application in various communication devices.

It is noted that the dimensions, shapes of the elements, and frequency ranges mentioned above are not restrictive conditions of the present disclosure. Antenna designers can adjust these settings according to different requirements. The antenna system of the present disclosure is not limited only to the configurations shown in FIGS. 1 to 9. The present disclosure may include any one or multiple features of any one or multiple embodiments shown in FIGS. 1 to 9. In other words, not all the features depicted in the figures need to be simultaneously implemented in the antenna system of the present disclosure.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna system, comprising:
a main ground element;
a floating ground element adjacent to the main ground element, wherein the floating ground element is separated from the main ground element;
a first antenna element having a first feeding point, wherein the first antenna element is coupled to the floating ground element; and
a second antenna element having a second feeding point, wherein the second antenna element is coupled to the main ground element;
wherein the main ground element and the floating ground element are disposed on a same plane;
wherein the first antenna element comprises:
a first radiation portion coupled to the first feeding point;
a second radiation portion; and
a third radiation portion, wherein the third radiation portion is coupled to the first radiation portion through the second radiation portion;
wherein the second radiation portion comprises a first semicircular arc portion, a second semicircular arc portion, a third semicircular arc portion, and a fourth semicircular arc portion.

2. The antenna system according to claim 1, wherein the floating ground element is surrounded by the main ground element, and a partition gap is formed between the floating ground element and the main ground element.

3. The antenna system according to claim 1, wherein the first antenna element supports a vehicle communication and covers a first frequency band.

4. The antenna system according to claim 3, wherein the first frequency band is between 5850 MHz and 5925 MHz.

5. The antenna system according to claim 1, wherein the first antenna element is a monopole antenna.

6. The antenna system according to claim 3, wherein the first radiation portion substantially has a wide stripe shape.

7. The antenna system according to claim 3, wherein a length of the first radiation portion is approximately equal to 0.25 times the wavelength of the first frequency band.

8. The antenna system according to claim 3, wherein the second radiation portion substantially has a meandering shape.

9. The antenna system according to claim 3, wherein a length of the second radiation portion is approximately equal to 0.5 times the wavelength of the first frequency band.

10. The antenna system according to claim 3, wherein the third radiation portion substantially has a narrow stripe shape.

11. The antenna system according to claim 3, wherein a length of the third radiation portion is approximately equal to 0.5 times the wavelength of the first frequency band.

12. The antenna system according to claim 1, wherein the second antenna element supports a mobile communication and covers a second frequency band, a third frequency band, and a fourth frequency band.

13. The antenna system according to claim 12, wherein the second frequency band is between 617 MHz and 960 MHz, the third frequency band is between 1710 MHz and 2690 MHz, and the fourth frequency band is between 3300 MHz and 5925 MHz.

14. The antenna system according to claim 1, wherein the second antenna element is a monopole antenna, a dipole antenna, a loop antenna, a patch antenna, a planar inverted F antenna, or a chip antenna.

15. The antenna system according to claim 1, wherein the second antenna element comprises:
a fourth radiation portion coupled to the second feeding point;
a fifth radiation portion coupled to the fourth radiation portion, wherein the fifth radiation portion and the fourth radiation portion are respectively disposed on two perpendicular planes;
a sixth radiation portion coupled to the fourth radiation portion, wherein a slot is formed between the sixth radiation portion and the fourth radiation portion; and
a seventh radiation portion coupled to the second feeding point.

16. The antenna system according to claim 1, wherein a distance between the second antenna element and the first antenna element is between 40 mm and 60 mm.

17. The antenna system according to claim 1, further comprising:
a carrier plate, wherein the floating ground element is disposed on the carrier plate;
a printed circuit board configured to support the carrier plate, wherein the main ground element is disposed on the printed circuit board;
a system ground plane;
and one or more conductive elements, wherein the main ground element is further coupled to the system ground plane through the conductive elements.

18. The antenna system according to claim 1, further comprising:
a third antenna element; and
a fourth antenna element, wherein the first antenna element, the second antenna element, the third antenna element, and the fourth antenna element are interleaved with each other and arranged in a straight line.

19. The antenna system according to claim 1, wherein an opening of each of the first semicircular arc portion and the third semicircular arc portion faces a first direction.

20. The antenna system according to claim 19, wherein an opening of each of the second semicircular arc portion and the fourth semicircular arc portion faces a second direction opposite to the first direction.

* * * * *